May 22, 1923.
F. J. MORSE
AIRCRAFT
Filed May 17, 1922
1,455,801
3 Sheets-Sheet 3
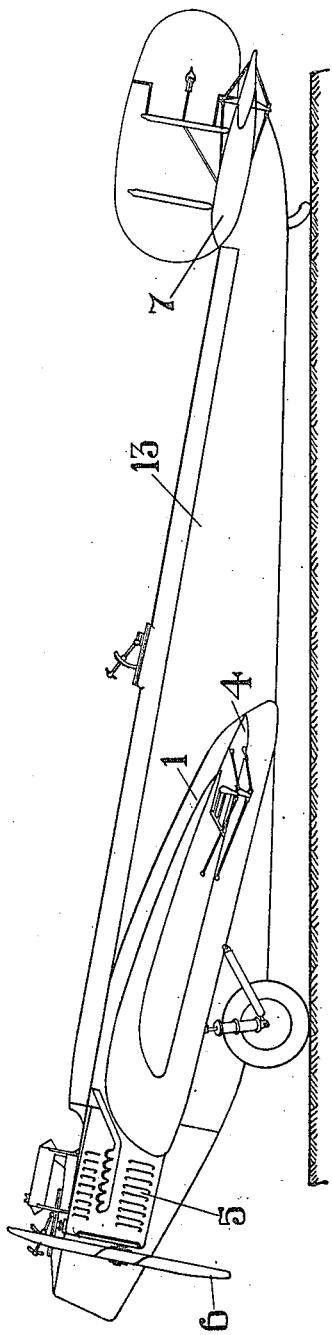
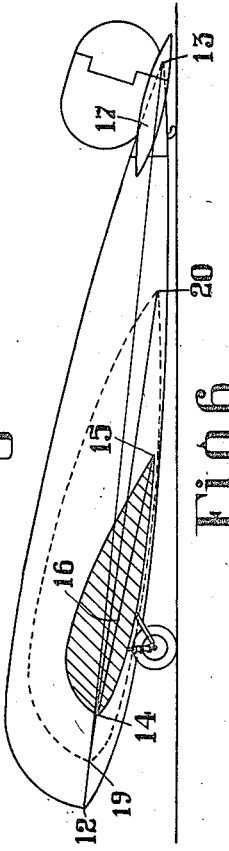
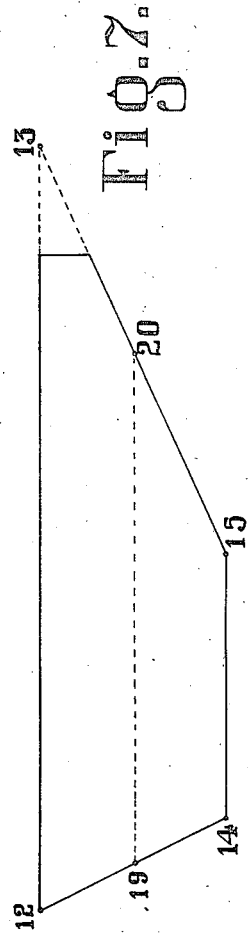

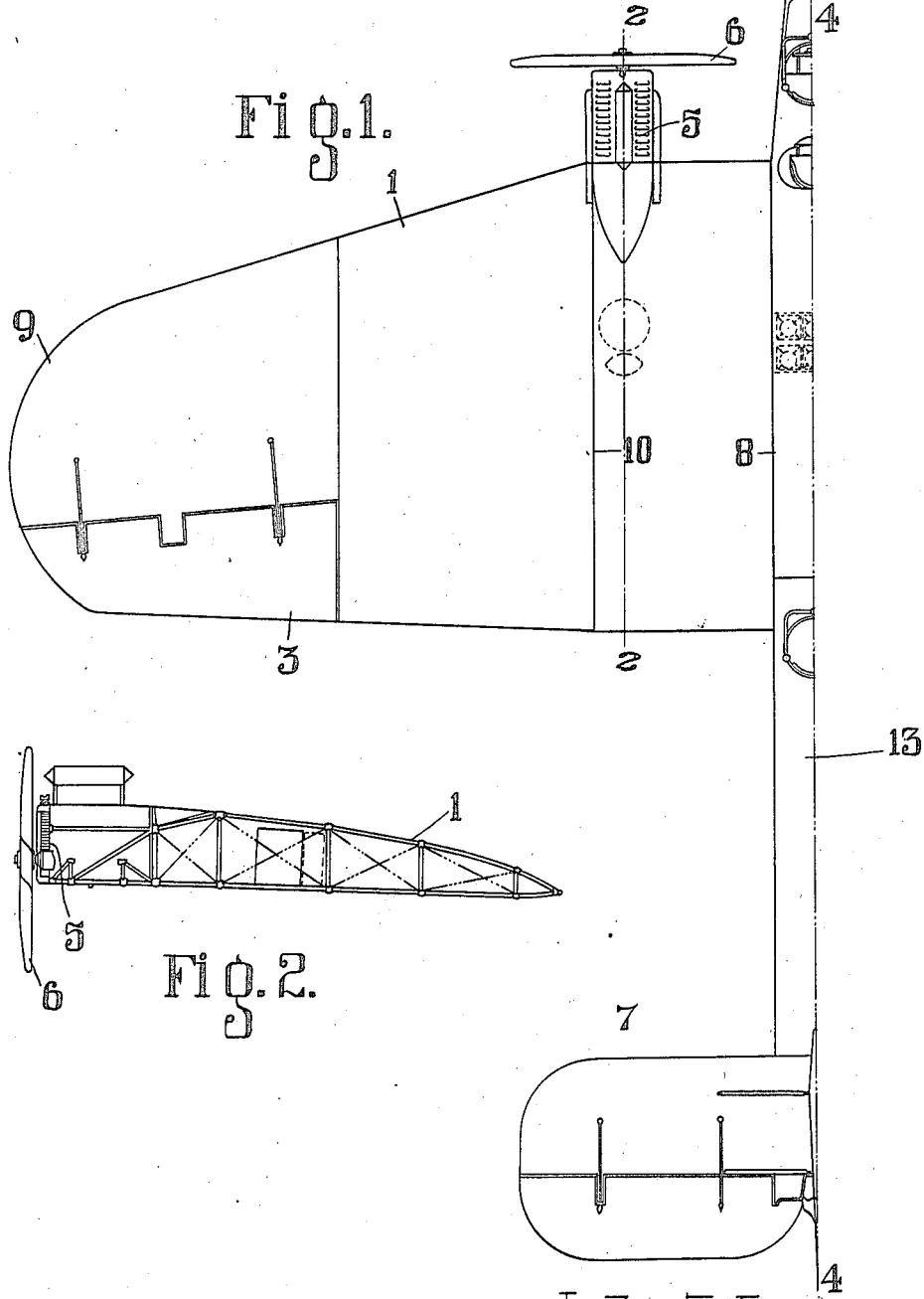

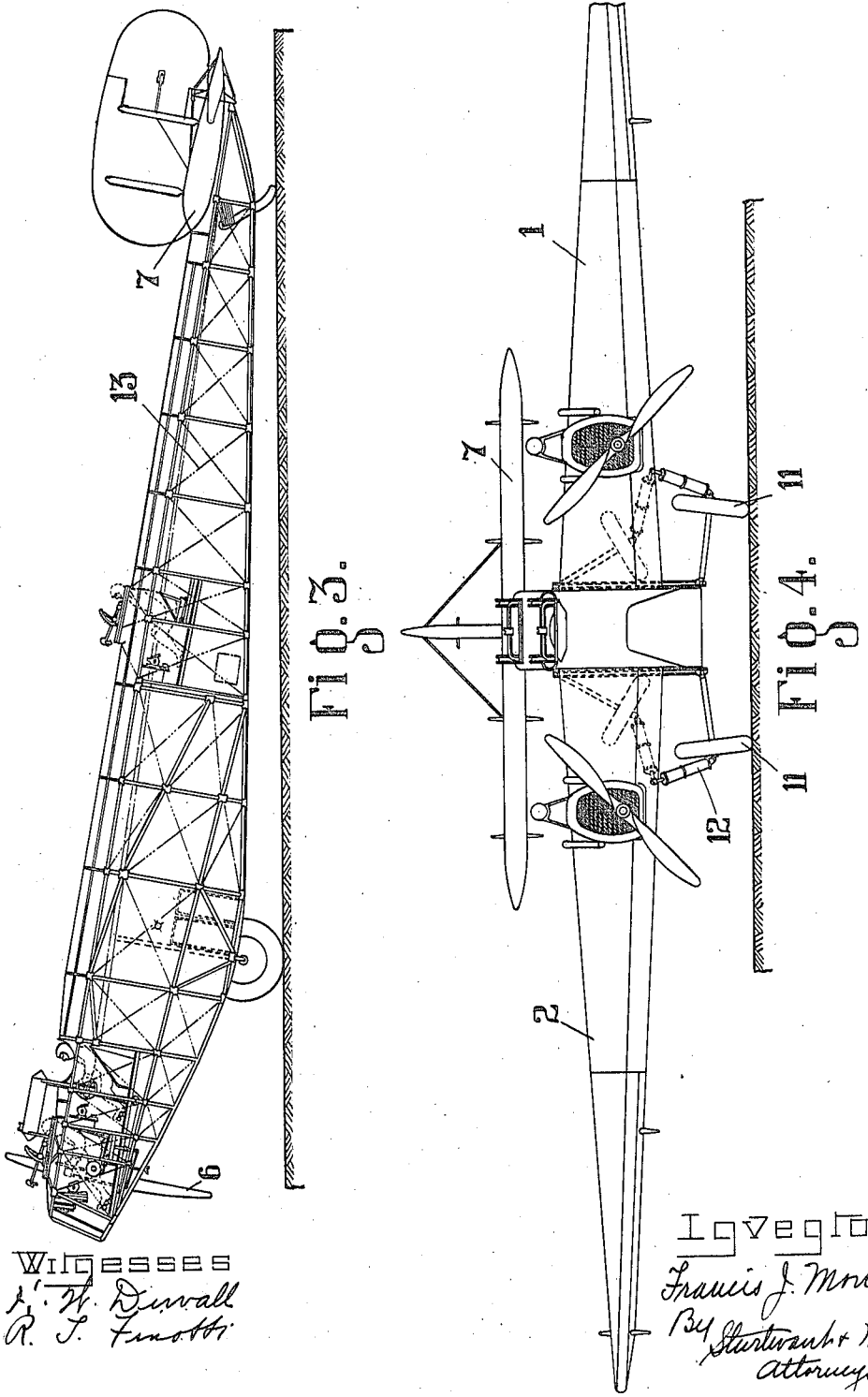

Patented May 22, 1923.

1,455,801

UNITED STATES PATENT OFFICE.

FRANCIS JOHN MORSE, OF NORWICH, ENGLAND.

AIRCRAFT.

Application filed May 17, 1922. Serial No. 561,643.

*To all whom it may concern:*

Be it known that I, FRANCIS JOHN MORSE, subject of the King of Great Britain, residing at Norwich, England, have invented certain new and useful Improvements in Aircraft, of which the following is a specification.

The present invention relates to improvements in aircraft and more particularly to aircraft of what is known as the cantilever type, that is to say those in which the structural parts necessary for the support of the craft, are enshrouded within its bounding surfaces which are of pterygoid aerofoil cross section.

An object of the present invention is to provide an aircraft which will present the least possible resistance to flight. A further object is to provide an aircraft of the above type with an alighting gear of small height, and further to arrange the tail so that it will not be shrouded or "blanketed" in flight by the main planes.

According to the present invention an aircraft is formed with fuselage and wings similar in cross section, that is to say, both are of pterygoid aerofoil cross section and deep enough to accommodate the structural girders necessary for the support of the craft and for passengers, goods, engines, petrol tanks, and the like, whilst the said fuselage is arranged at a different angle of incidence to the wings, and the tail unit which can be of monoplane or multiplane type lies above the main planes of the aircraft.

The body of the aircraft of aerofoil cross section may be arranged to be at a continually increasing angle of incidence from its median section line to its outer bounding edge which latter will usually be coincident with the bounding edge of the supporting wings.

The invention is more particularly described with reference to the accompanying drawings in which:—

Figure 1 is a plan view of an aeroplane according to the present invention.

Figure 2 is a section on the line 3—3 of Fig. 1.

Figure 3 is a section on the line 4—4 of Fig. 1.

Figure 4 is a front view.

Figure 5 is a side view of the same aeroplane.

Figure 6 is a side view of a modified form of construction.

Figure 7 is a corresponding plan view of Fig. 6 (with the tail removed).

The aircraft is of the type in which the planes 1, 2, and their control surfaces, such as ailerons 3, 4, are of the cantilever type, that is to say are supported entirely by internal structural constructions within the planes, and these are formed of such depth that they are sufficient to enclose girders of the necessary strength. The engines 5, are arranged so that the propellers 6, will lie at some distance away from the leading edge of the planes whilst however, the engine is partly enclosed by the plane. This allows that the propellers may work with a good efficiency as their slip stream has sufficient time to follow the curvature of the plane without backwash on to the propellers before the actual plane is reached.

The fuselage is as shown in the drawings of pterygoid aerofoil cross section. That is, it is a lamina which has a clubbed or thickened front edge when viewed in longitudinal section and which is wide enough compared with its length to prevent wind flowing off from the sides to such an extent as would nullify to any extent the lifting of the plane. In other words, it is a fuselage which is wing-like in form and the word "pterygoid aerofoil" is used to mean "winglike". The fuselage 13 is given sufficient width and camber relatively to the direction of motion so that it will be capable of assisting itself in flight independent of the wings. Its chord is arranged at a lesser angle of incidence than the wings so that the tail plane 7, will lie at a convenient height above the said wings.

As regards the wings, in order to allow for girders having a straight top and bottom edge, an aerofoil section is taken and increased at a constant rate from wing shoulder such as along the line 8, to wing tip such as at the point 9. This may of course be slightly modified towards the extreme wing 9, where extreme conditions apply owing to the escape of air from the edge of the plane, and the provision of the aileron control surfaces 3, 4.

It is also preferred that the length of the plane increases at a constant rate of increase from for instance, the tip of the plane 9, to the shoulder of the wing as at 8, or, in the arrangement shown, to a line such as 10. It is however, not essential that this rate of increase in length of the plane, should be equal to the rate of increase of the depth of the plane.

It will be seen that the aircraft wing virtually is divided into two zones, in the particular form shown, one between the point 9, and the line 10, and the other between the line 10, and the line 8. Between the point 9, and the line 10, the wing increases at a constant rate of depth and is also increased at a different constant rate of length. Between the line 10, and the line 8, however, the wing is increasing in depth at a certain constant rate which may be equal if desired to the rate of increase in depth between the point 9, and the line 10, but between the line 10 and the line 8, the wing is not increasing in length but has parallel leading and trailing edges, that is to say that its rate of increase in length is unity.

In order to avoid surfaces which in flight would have no useful resistance, but on the contrary present definite positive resistance to the motion of the aircraft through the air, in addition to, as above stated, enclosing within the plane, parts of the engines and the whole structural support for the engine and for the planes, the alighting gear such as wheels 11, or floats are arranged with their shock absorbers 12, so that they may be in flight collapsed into the interior of the aerofoil structure of the aircraft. Virtually, therefore when in flight the aircraft will present almost totally throughout a pure aerofoil structure.

The advantage of the arrangement of the present invention is that an alighting gear of shallow proportions only is required.

As shown in Figures 6 and 7, the element uniting the supporting wings 16, with the tail 17, is arranged to be of constantly differing angle of incidence, from the median line 12—13, to the bounding line 14—15, which line will usually be the meeting line for the attachment of the supporting wings. That is to say that the chord 14—15 will present a greater angle of incidence than the chord 19—20 taken on a section further towards the centre line of the air craft fuselage, whilst again the chord 12—13 presents a lesser angle of incidence than does the section taken on the line 19—20 or that taken on the line 14—15.

It will be found desirable to arrange that the leading edge 12—14 and the trailing edge 13—15 will be straight lines.

I declare that what I claim is:—

1. An aircraft comprising in combination supporting wings of pterygoid aerofoil form, a fuselage of similar form arranged at a different angle of incidence from the angle of incidence of the wings, and a tail plane mounted on said fuselage above the plane of the wings.

2. An aircraft comprising wings, a fuselage of pterygoid aerofoil longitudinal cross section merging into said wings, the chords of successive cross sections of said fuselage progressively increasing in angle of incidence from the median line of said fuselage to the junction with the wings.

3. An aircraft comprising cantilever wings enclosing all structural members necessary for their support, a fuselage of similar cross-section merging into said wings, the chords of successive cross sections of said fuselage progressively increasing in angle of incidence from the median line of said fuselage to the junction with the wings and a tail plane mounted on said fuselage above the plane of the wings.

4. An aircraft comprising cantilever wings enclosing all structural members necessary for their support, a fuselage of similar cross-section, the chord of which lies at a different angle of incidence from the chord of the wings, and a tail plane mounted on said fuselage, the chord of which lies above the chord of the said wings.

5. An aircraft comprising cantilever wings enclosing all structural members necessary for their support, a fuselage of similar cross-section and having straight line leading and trailing edges merging into said wings, the chords of successive cross sections of said fuselage progressively increasing in angle of incidence from the median line of said fuselage to the junction with the wings.

In witness whereof, I have hereunto signed my name this 28th day of April, 1922, in the presence of two subscribing witnesses.

FRANCIS JOHN MORSE.

Witnesses:
ARTHUR T. EWAN,
CLEMENT P. COOPER.